Figure 1:
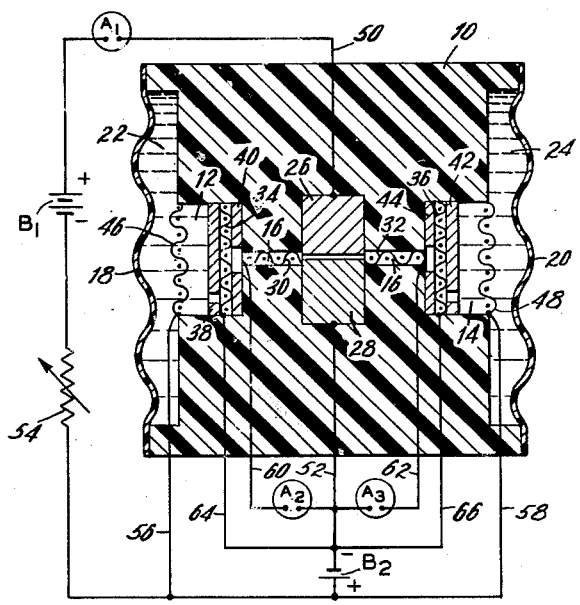

Nov. 17, 1964 R. M. HURD 3,157,832
FULL WAVE ELECTROCHEMICAL LINEAR DETECTOR
Filed Jan. 16, 1962

INVENTOR.
RAY M. HURD
BY John R Hoherty
ATTORNEY

United States Patent Office 3,157,832
Patented Nov. 17, 1964

3,157,832
FULL WAVE ELECTROCHEMICAL LINEAR
DETECTOR
Ray M. Hurd, Austin, Tex., assignor to Union Carbide
Corporation, a corporation of New York
Filed Jan. 16, 1962, Ser. No. 166,619
5 Claims. (Cl. 317—231)

This invention relates to a full wave electrochemical linear detector.

A family of electrochemical devices in which a number of different effects are achieved by the movement of ions in solution has recently attracted favorable attention. These devices have come to be known as solions. They are discussed in some detail in the literature: Journal of the Electrochemical Society, volume 104, No. 12 (December 1957); Yale Scientific Magazine, volume XXXII, No. 5 (February 1958) and Electronics Products Engineering Bulletin No. 1, published November 1957, by National Carbon Company, 30 East 42nd Street, New York 17, New York.

A recently developed solion is an electrochemical detector. It has the ability to produce an electrical current which is proportional to an applied signal, for example, an acoustical or hydraulic pressure signal. One type of electrochemical detector has the property that the electrical current is a linear function of the applied signal and this device is referred to as a "linear detector." It is primarily useful for measuring the intensity of the applied signal.

An electrochemical linear detector generally comprises a pair of compartments which contain a liquid electrolyte, one wall of which compartments includes one of a pair of flexible diaphragms. The liquid electrolyte is an ionized solution of a reversible redox system such as the iodine-iodide system. Between the compartments is mounted a barrier having an orifice therein and in juxtaposition with the orifice is a detecting electrode which is usually made the cathode in an external biasing circuit. The compartments each contain an electrode which is inert to the electrolyte solution, one of which electrodes is made the anode and the other of which is made the cathode in the biasing circuit.

When a voltage is applied between the electrodes in the compartments of the linear detector just described, reduction occurs at the cathode, oxidation takes place at the anode, and there is a resultant transfer of ions between the compartments. This transfer can be measured by the movement of reducible ions in the electrolyte solution, these ions being reduced at the detecting cathode producing an electrical current in the biasing circuit. The current will remain constant, but when a signal is applied to the flexible diaphragm of the anode compartment, the liquid electrolyte is caused to flow between the compartments and a proportional increase in the current is observed. This increased current is produced as a result of the greater number of ions reduced at the detecting cathode because of the flow of liquid electrolyte between the compartments. Thus a current is produced which is directly proportional to the applied signal. The transferred ions in the electrolyte solution are commonly referred to as "species," and the reducible ion is called the "measured species." In the iodine-iodide system, iodine is the measured species. A typical linear detector is described and claimed in the copending application of N. N. Estes et al., Serial No. 777,069, filed November 28, 1958, now Patent No. 3,056,908, issued October 2 1962.

As indicated, an electrochemical linear detector is primarily useful for meaursing the intensity of an applied signal. When the applied signal is alternating, however, the linear detector produces an output current which is proportional only to the positive or negative cycle of the signal. Hence, the response of the linear detector does not constitute a "full wave" replica of the applied signal. An arrangement in which a pair of linear detectors are coupled together in such manner that a full wave response is attained has been proposed, but this arrangement is limited in that there is a tendency for the response to attenuate with time. This effect is the result of depletion within the vicinity of the detecting cathodes of the measured species upon repeated cycling of the applied signal.

It is therefore the principal object of the invention to provide a full wave electrochemical linear detector. More specifically, another object is a full wave electrochemical linear detector whose response will not attenuate with time. Still another object is a full wave electrochemical linear detector having an adjustable sensitivity.

According to the invention these objects are achieved by the interposition of a pair of detecting electrodes between both compartments of an electrochemical linear detector containing an electrolyte solution of a reversible redox system. These detecting electrodes are adapted to measure the liquid flow of electrolyte in both directions between the compartments when an alternating signal is applied to the linear detector. Between the pair of detecting electrodes is a generating electrode which is adapted to generate in place an excess quantity of the measured species of the reversible redox system.

Figure 2:
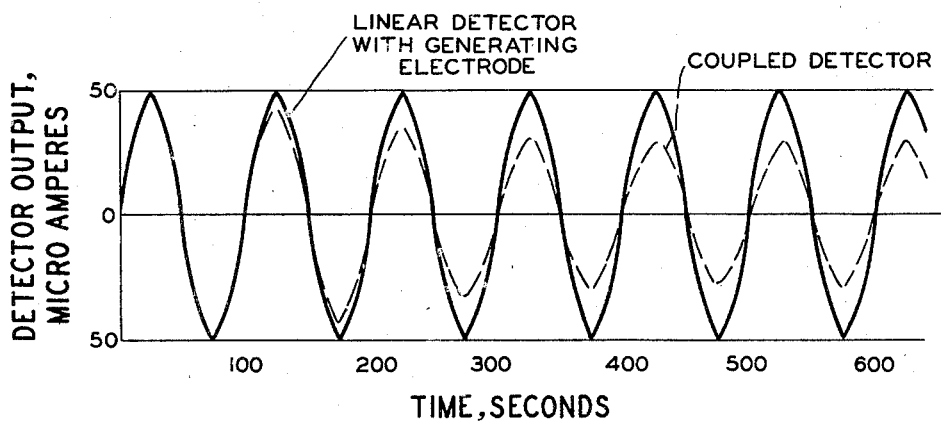

The invention will now be described more specifically with reference to the accompanying drawing in which:

FIG. 1 is a vertical section of an electrochemical linear detector embodying the invention, and FIG. 2 is a graph comparing the performance of the electrochemical linear detector with that of prior art devices.

Referring to the drawing, an electrochemical linear detector embodying the invention comprises a main body section 10 having recessed side walls provided with apertures 12, 14 which are centrally located therein. Between the apertures 12, 14 is a corridor 16 which is much smaller in size. Adjacent to the main body section 10 and mounted to its peripheral edges is a pair of flexible diaphragms 18, 20. It will be observed that by this construction a pair of compartments 22, 24 are formed which communicate through the corridor 16 and in which the flexible diaphragms 18, 20 constitute one wall.

A generating electrode 26 is positioned within the corridor 16 and oppositely spaced therefrom is a pick-up electrode 28. The generating and pick-up electrodes 26, 28 suitably are composed of platinum bars which are rigidly mounted within the main body section 10. Also positioned in the corridor 16 is a pair of detecting cathodes 30, 32. The cathodes 30, 32 are positioned on opposite sides of the generating and pick-up electrodes 26, 28 and suitably are composed of platinum gauze. A pair of scavenging electrodes 34, 36 are preferably mounted within the apertures 12, 14 in both compartments 22, 24. These scavenging electrodes 34, 36 are positioned in close proximity to the cathodes 30, 32 and are mounted between apertured discs indicated at 38, 40 and 42, 44. The compartments 22, 24 are filled with a liquid electrolyte solution of a reversible redox system and mounted in both compartments adjacent to the apertures 12, 14 are anode electrodes 46, 48. The anode electrodes 46, 48 and the scavenging electrodes 34, 36 are also suitably composed of platinum gauze.

The generating electrode 26 and the pick-up electrode 28 are provided with leads 50, 52 and are connected into an external circuit including a source of current such as a battery $B_1$. The lead 50 connects the generating electrode 26 to an ammeter $A_1$ which in turn is connected to the positive terminal of the battery $B_1$. The pick-up electrode 28 is connected by the lead 52 to the negative terminal of a battery $B_2$. A variable resistor 54 is connected in series between the opposite terminals of the battery $B_1$ and the battery $B_2$. Thus it will be seen that the battery $B_1$ supplies a constant current between the generating electrode 26 and the pick-up electrode 28 which can be controlled by adjustment of the variable resistor 54.

The anode electrodes 46, 48 are provided with leads 56, 58 and are connected into the circuit between the variable resistor 54 and the positive terminal of the battery $B_2$. The battery $B_2$ supplies a bias current between the anode electrodes 46, 48 and the detecting cathodes 30, 32 which are provided with leads 60, 62 and which are connected into the circuit on the negative terminal side of the battery $B_2$. The leads 60, 62 connect the cathodes 30, 32 to ammeters $A_2$, $A_3$ which read the bias current in the circuit. The scavenging electrodes 34, 36 are connected into the circuit by leads 64, 66 and are biased negative with respect to the anode electrodes 46, 48 by the battery $B_2$.

The operation of the linear detector will now be described with reference to the use of an electrolyte in the iodine-iodide system, although as will be pointed out other reversible redox systems may be used as the electrolyte. In the iodine-iodide system, iodine dissolved in an aqueous solution of potassium iodide exists predominantly as the tri-iodide ion, $I_3^-$.

With the electrodes properly biased in the circuit as described above, iodine becomes concentrated at the anode electrodes 46, 48 in both compartments 22, 24 and is depleted at the cathodes 30, 32 in accordance with the following equations:

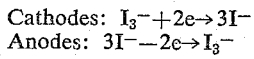

As a result of this difference in iodine concentration there occurs a flow of current in the circuit which can be measured on the ammeters $A_2$, $A_3$. Now if an alternating signal is applied to either one of the flexible diaphrams 18, 20, liquid electrolyte is caused to flow through the corridor 16, in both directions, between the compartments 22, 24. This liquid flow results in an increased concentration of iodine at the detecting cathodes 30, 32 and a proportional increase in the flow of current in the circuit is observed. The current resulting from the liquid flow past the cathode 30, from the compartment 22, is measured on the ammeter $A_2$ while that produced as the result of liquid flow past the cathode 32, from the compartment 24, is measured on the ammeter $A_3$. Thus an output current response is produced which is proportional to both the positive and negative cycles of the alternating signal.

With the battery $B_1$ supplying current between the generating and pick-up electrodes 26, 28 the iodine which is detected at the cathodes 30, 32 is continuously formed at the generating electrode 26. This keeps the response of the linear detector from becoming attenuated with time over the period during which the signal is applied. The amount of iodine formed at the generating electrode 26 is proportional to the current supplied by the battery $B_1$ which can be read on the ammeter $A_1$.

The scavenging electrodes 34, 36 are biased negative with respect to the anode electrodes 46, 48 in the compartments 22, 24 and prevent any stray ions of iodine from entering the corridor 16. The apertured discs indicated at 38, 40 and 42, 44 not only serve to support the scavenging electrodes 34, 36 but also serve to reduce the effects of hydraulic eddy currents in the electrolyte solution of the linear detector.

A number of linear detectors embodying the invention and of the construction illustrated have been made and tested. These tests prove the effectiveness of the linear detector to produce an output current response which will not attenuate with time.

For example, one series of tests was conducted utilizing a linear detector of the construction shown in FIG. 1 and having an electrolyte solution of potassium iodide containing iodine. The concentration of the iodide in the electrolyte solution was 1.0 N while the concentration of iodine was 0.005 N. The linear detector was connected into an external circuit including a 3 volt battery as a source of current supply. The electrodes of the linear detector were biased in the circuit by a battery having a voltage of 0.9 volt. The circuit also included a variable resistor which was adjusted to supply a current to the generating electrode of up to one milliampere. The linear detector was then tested by applying a sinusoidal hydraulic pressure signal to one of the flexible diaphragms. This signal had an amplitude of about 100 dynes/cm.² The resultant current flow in the bias circuit was measured by ammeters and was recorded. In the test, another linear detector of the coupled construction referred to above was connected into the circuit and a sinusoidal hydraulic pressure signal of the same amplitude was applied to it. The output current response for both detectors is represented graphically in FIG. 2. It will be readily appreciated by reference to the graph that the performance of the linear detector of this invention was far superior to that of the coupled detector whose output current response attenuated with time over the period in which the alternating signal was applied.

Another important advantage of the invention resulting from the provision of the generating electrode resides in the adjustable sensitivity of the linear detector. The sensitivity is a direct linear function of the current supplied to the generating electrode of the detector. This current, and hence the sensitivity, as indicated, can be controlled by the simple adjustment of the variable resistor in the circuit.

A number of different materials may be used in the construction of the linear detector of the invention. For instance, most any reversible redox system may be used as the electrolyte. Besides the iodine-iodide system mentioned, the ferrocyanide-ferriccyanide and cerous-ceric systems are suitable. The electrolyte is dissolved in a solvent; the requirements of the solvent are that it dissolve the measured specie of the redox system and permit one of the species to become ionized. Suitable solvents are alcohols, particulraly methyl, ethyl, amyl, and butyl; ethyl alcohol being preferred. Desirably an alcohol-water mixture is employed.

The main body section and the flexible diaphragms must be inert to the liquid electrolyte solution and preferably are composed of inert plastic materials. The flexible diaphragms should also be composed of a highly compliant material, polytrifluoromonochloroethylene, for example, being suitable for both the main body section and the diaphragms. Other plastic materials may also be used depending on the liquid electrolyte; nylon, polyethylene, polymethylmethacrylate or vinylidene plastics, for instance, are suitable.

Electrodes for use in the linear detector must also be inert to the liquid electrolyte and, as indicated, preferably are composed of platinum. Other noble metals, however, may be used, for example, iridium, palladium, and rhodium or alloys thereof. Pyrolytic carbon electrodes may be used as disclosed in the copending application of G. E. Evans et al., Serial No. 777,012, filed November 28, 1958, now Patent No. 3,054,030, issued on September 11, 1962.

It will be apparent that many other modifications within the scope of the invention may be made as will occur to those skilled in the art.

I claim:

1. A full wave electrochemical linear detector comprising a body portion including therein a pair of compartments and a corridor between said compartments, one wall of each of said compartments having therein a flexible diaphragm, said compartments each containing an electrolyte solution comprising a reversible redox system; an electrode in each of said compartments; a pair of detecting electrodes in said corridor, each one of which is adjacent to each of said compartments; a scavenging electrode in each of said compartments in close proximity to one of said detecting electrodes; a generating electrode between said detecting electrodes in said corridor and a pick-up electrode oppositely spaced from said generating electrode.

2. A detector as defined by claim 1 in which said generating and pick-up electrodes are platinum bars mounted in said body portion.

3. A detector as defined by claim 2 in which the other of said electrodes are composed of platinum gauze.

4. A detector as defined by claim 3 in which said reversible redox system is the iodine-iodide system.

5. A detector as defined by claim 1 in which said generating and pick-up electrodes are provided with leads for connection to a source of current and a variable resistor, said variable resistor being adapted to control the current supplied between said generating and pick-up electrodes.

References Cited in the file of this patent
UNITED STATES PATENTS

| | | |
|---|---|---|
| 2,896,095 | Reed | July 21, 1959 |
| 3,050,665 | Hurd | Aug. 21, 1962 |

OTHER REFERENCES

Solion Principles of Electrochemistry and Low Power Electrochemical Devices (published by U.S. Naval Ordnance Laboratory in 1957); pages 39–40.

Solion Principles of Electrochemistry and Low-Power Electrochemical Devices, pages 31, 32, 33.